April 15, 1958 J. TETI 2,830,657
ASPIRATING GAS MIXER
Filed Nov. 8, 1952

INVENTOR
JOHN TETI
BY
ATTORNEY

United States Patent Office 2,830,657
Patented Apr. 15, 1958

2,830,657

ASPIRATING GAS MIXER

John Teti, Wilmington, Del., assignor to Air Reduction Company, Incorporated, New York, N. Y., a corporation of New York Application November 8, 1952, Serial No. 319,487

3 Claims. (Cl. 158—27.4)

This invention relates to an aspirating gas mixer which is particularly useful in oxygen-acetylene welding or cutting.

It is an object of this invention to provide an aspirating oxygen-acetylene mixer which has an adequate mixing and aspirating action and is highly resistant to flashback, which is the internal burning that occurs at the point of mixing after the backfire of downstream gases.

It is a further object of this invention to provide a stable aspirating mixer made of a few parts with these parts being so constructed as to be easily assembled and to give the structure and dimensions which provide the desired high resistance to flashback and the adequate mixing and aspirating action.

When welding or conducting other operations with an oxygen-acetylene flame, a phenomena known as backfire often occurs. This backfire is the rapid inward propagation of a flame within the welding apparatus, for instance, from someplace at or near the orifice of the welding device towards the point of mixing of combustion-supporting oxygen and combustible acetylene. This backfire can be considered as an abrupt explosion which happens under certain welding conditions, such as when the projection of a small piece of slag into the mixing passage occurs, when overheating of the welding device occurs, or when interference with the pressures of the gases occurs.

The backfire itself is not seriously harmful. However, in prior injector-type or aspirating mixers, it often happened that the consequence of backfire under normally varied gas flow conditions was an internal ignition and burning of mixed gases within the mixer at the point of the mixing of oxygen and acetylene. This occurred usually because hot backfire gases ignited the combustible mixture which formed when the mixer again began to function normally. This internal burning is known as flashback and often is quite destructive. The intense heat of the internal oxy-acetylene flame in flashback can ruin or seriously damage the structure of the mixer and the welding device or other apparatus having a mixer.

One of the attempts to prevent flashback in injector-type mixers relied on the use of flame arrestors downstream from the point of mixing to quench the backfire. This flash arrestor functioned, when it worked, like the well-known Davy miner's lamp. However, this attempt was generally not satisfactory because the quenching wire had to have an impractically small mesh. This required replacement of the wire by very porous non-metallic materials which, in turn, were not satisfactory under the high-temperature conditions of oxy-acetylene backfire.

In prior injector-mixer devices having no flashback screen downstream from the point of mixing, the explosive backfire wave apparently forced the burning oxygen and acetylene gases and/or hot burned backfire gases into the oxygen and acetylene supply passages. After the backfire gases ceased their rearward travel, the oxygen and acetylene gases begin to flow in the normal direction, returned to the point of mixing, formed a combustible mixture, and were sometimes ignited by contact with the hot backfire gases at the point of mixing as above mentioned. The subsequent internal burning, or flashback, of the oxygen and acetylene caused the damage aforementioned and of course constituted a serious problem.

In some manner the heated backfire gases must be deactivated sufficiently prior to the formation of, and contact with, a readily-combustible mixture of oxygen and acetylene so that ignition cannot occur. However, the instant-type mixer must also be constructed to adequately provide for aspiration or injection of acetylene by oxygen and the mixing of the two gases under normal conditions. Thus, it is necessary to provide a construction which, during normal operation, will give adequate aspiration and mixing and yet have a high resistance to flashback after backfire occurs or a high stability.

The instant invention solves this problem and accomplishes the above-mentioned objects by a relatively simple aspirating mixer construction. In accordance with the instant invention, a few structural features are integrated to provide aspiration of acetylene by oxygen and mixing thereof during normal operation and to provide adequate flashback resistance after backfire.

The aspiration is accomplished by moving oxygen radially-inwardly through a continuous transverse slot with the rear wall of the slot being in the plane of the rear wall of the aspirating mixing passage. Since the transverse slot has a radially-inwardly diminishing cross-sectional area, the oxygen acquires an increased velocity in a radial direction, prior to discharge through the relatively large oxygen orifice which opens axially into the aspirating mixing passage. At this circular sharp-edged orifice, the oxygen begins to change its direction of flow from a radial direction to an axial direction and constricts itself temporarily as it flows axially. At this point of constriction, the oxygen has an aspirating effect on the acetylene flowing in a large unrestricted acetylene passage which is adjacent to the transverse plane of the circular edge of the oxygen orifice. Thereafter, the oxygen thoroughly mixes with the acetylene in the mixing space.

The flashback resistance after backfire is provided by the above-described structure along with a short, thin annular quenching passage in the oxygen flow path upstream from, and opening into, the continuous radial oxygen slot. The suppression of flashback is believed to result from the particular operation after backfire which is derived from the metallic mass forming the flat rear wall of the aspirating mixing passage, the large unrestricted acetylene passage which is forward of, but adjacent to, this rear wall, and the sinuous restricted oxygen passage including the thin surface-quenching passage. This particular operation, hereinafter described in detail, results in a deactivation of backfire gases and a flow sequence of gases which together prevent a combustible mixture of oxygen and acetylene from coming into contact with backfire gases which are still capable of igniting the mixture and so causing flashback.

The accomplishment of the above-mentioned and other objects and the features and advantages of the invention will be apparent from the following description and accompanying drawings, in which.

Figure 4:
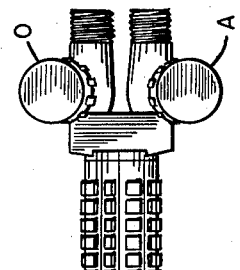
Fig. 4 is a cross-sectional view of only the mixer assembly of Figs. 1-3 (except that a modification in the mixer is shown which comprises a very small axial oxygen passage opening into the aspirating zone) and shows that the mixer assembly is formed by only three elements.

A preferred embodiment of the instant aspirating mixer is shown on the drawing in Fig. 1 as incorporated in a manual welding torch and will now be described. The aspirating mixer M has the torch tip T attached to its forward part while the rear part of the mixer M fits into the mixer supply means S. The rearward part of the outer surface of the supply means S is formed with a handle H. A coupling member or union nut C partially encases mixer M and connects the mixer M to the mixer supply means S when the inclined rear part of the mixer M is received in the inclined forward part of the mixer supply means S. The supply means S has upper and lower valve assemblies O, A, rearwardly of the handle H. The upper valve assembly O when connected to an oxygen supply conduit admits oxygen, which has been conventionally regulated to the desired pressure of about 20–40 p. s. i. g., into the mixer supply means S. Similarly, acetylene at a relatively low pressure of about 1–10 p. s. i. g. is admitted to the mixer supply means S by means of the lower valve assembly A.

Since the torch T and the valve assemblies O and A are conventional items, they are not disclosed in detail in the interests of clarity in presenting the instant invention. For the same reason, the means for supplying oxygen and acetylene to valves of the mixer supply means S have not been shown. It is to be understood that any conventional means which supplies the oxygen and acetylene at desired pressures for an injector-type mixer can be used. These various devices including mixer supply means S can be respectively referred to as oxygen supply means and acetylene supply means and can constitute many arrangements of conventional apparatus, other than that which is shown or mentioned.

Figures 1, 2, 3:
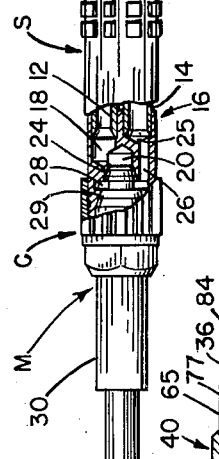
Fig. 1 is a broken, partially cross-sectioned, side elevational view of a manual welding torch embodying the invention.
Fig. 2 is an enlarged cross-sectional view principally of the aspirating mixer shown in Fig. 1.
Fig. 3 is an enlarged view of the mixer shown in Fig. 2 and more clearly shows the features of the mixer, such as the aspirating structure and the oxygen quench passage.

In Fig. 1 it can be seen, where the welding device is partially cross-sectioned, that the mixer supply means S has an upper oxygen tube 12 and a lower acetylene tube 14 which fit into the forward distribution part or gas distributor 16 of the supply means S. The upper oxygen tube 12 fits into upper bore 18 which bore is intersected forwardly by a central bore 20 in distributor 16. The forward portion of bore 20 is provided with an inclined face 24 for mating with the correspondingly inclined rear face of the central core element of the mixer M.

The lower acetylene tube 14 fits into bore 25 which is intersected forwardly by a lower bore 26 in distributor 16 which bore opens forwardly into a rear acetylene supply annulus 28. Forwardly from this acetylene chamber 28, the gas distributor 16 of supply means S is provided with an inclined face 29 against which a corresponding face of the outer annular member of the mixer M abuts.

The details of the means for connecting the torch tip T to the preferred embodiment of the mixer M and the details of the inter-fitting of the mixer M into the gas distributor 16 of the mixer supply means S are shown in Fig. 2.

The torch tip T is conventionally threaded into the forward bore or mixing channel 31 of the tubular mixer body or barrel 30. The mixing channel 31 of the barrel 30, along with the rear part of the bore 32 of the torch tip T, provide the space for mixing of the oxygen and acetylene. This space can be referred to as a mixing space.

The mixer M, when its rearward inclined surfaces bear against the mating surfaces of the gas distributor 16, is coupled to the gas distributor 16 by coupling C. Thus, in assembling the torch, coupling C slides rearwardly over the outer surface of the mixer body 30 until its interior threads engage the outer threads on gas distributor 16. The coupling C is then threaded onto the gas distributor 16 until it abuts the outwardly extending shoulder 34 of mixer body 30. Gas tight seals between the gas distributor 16 and the mixer M are effected by annular gaskets 36 and 38 attached to the mixer M.

The mixer M is assembled as a unit (as more clearly appears in Fig. 4) and is comprised of three principal parts, (1) the tubular mixer body or barrel 30 having mixing channel 31, (2) the mid-annular structure or member 40 which, in part, fits into the rear of mixer body 30 and (3) the core element 42 which rearwardly projects out from the mid-annular member 40 and has its forward portion positioned in cylindrical cavities of the mid-annular structure 40. All of the parts are preferably fabricated from brass.

Referring to the mixer body or barrel 30, it can be seen in Figs. 2 and 3 that, at the upstream end of the mixing bore 31, a larger-diameter axial cavity 44 is formed. The forward part of the mid-annular member 40 is positioned in this cavity 44. In assembling, the mid-annular member 40 is urged into the cavity 44 until the outwardly extending shoulder 46 of annular member 40 abuts the rear transverse face 48 of the mixer barrel 30. In this position, the mid-annular member 40 is then attached by soldering to the mixer body 30. The forward face of the mid-annular member 40 is thus spaced by shoulder 46 from the bottom 54 of the cavity 44. By this arrangement, a relatively large annulus or inlet means 52 is provided between the plane of the ledge-like bottom 54 of the cavity 44 and the plane of the forward face 50 of the mid-annular member 40 and has a longitudinal dimension of about 0.107 inch. Annulus 52 can be referred to as a transverse unrestricted acetylene passage opening peripherally into rearmost part of an aspirating mixing passage which will be defined hereinafter.

The mid-annular member 40 has, rearwardly from its shoulder 46, a cylindrical surface 55 and an inclined surface 56, both of which are formed in part by forward gasket 36. Both surfaces 55, 56 bear against corresponding surfaces of the gas distributor 16 including inclined face 29 (previously mentioned). The rear transverse annular face 57 of the mid-annular structure 40, when assembled in the gas distributor 16, is in the same plane as the plane of the forward transverse surface 58 of an annular recess 59 formed between the forwardly divergent or inclined surfaces 24, 29 of the gas distributor 16. These two transverse annular surfaces 57 and 58 form the forward wall of the previously mentioned rear acetylene chamber 28.

The interior of the annular member 40 has two main bores 60 and 61. The smaller-diameter forward bore 60 has a smooth surface and terminates forwardly in an interiorly-extending lip 62. This lip 62 is as thin as production machining and strength of material will permit. The longitudinal dimension of lip 62 is about 0.025 to 0.030 inch. The orifice or opening formed by the sharp circular rear edge 63 of the lip 62 has a diameter about 0.187 of an inch which is somewhat smaller than the diameter (about 0.250 of an inch) of the mixing passage 31. Referring to the rearward bore 61 of the mid-annular member 40, it can be seen that it is larger in diameter than the forward bore 60. At the juncture of the forward bore 60 and the rearward bore 61, the annular recess or forward acetylene distribution chamber 65 is formed and it has an appreciably larger diameter than the diameter of rearward bore 61. The mid-annular member body portion which extends outwardly from the forward bore 60 has twelve longitudinal holes extending rearwardly from the forward face 50 of the mid-annular member 40 to the forward acetylene distribution chamber 65. The holes, two of which appear on the drawings and are designated by reference numeral 67, are circumferentially equi-distant from each other and are equidistant from the longitudinal axis of the mid-annular member 40. In assembling, the forward bore 60 of the mid-annular member 40 receives by press fit the core element 42 which is the above-mentioned third part of the mixer M.

The core element 42 has an inclined rearward surface which is formed in part by gasket 38 and bears against the forwardly-diverging or inclined surface 24 of the gas distributor 16. This seal provides a seal between the oxygen and acetylene passages in the mixer M and the gas distributor 16.

The forward end of the core element 42 has two portions, a front portion 70 and a mid-portion 72, having diameters which are progressively smaller in a forward direction than the diameter of the main rear portion 74 of the core member. The outer surface of the forward portion 70 is smooth as is the facing, forward surface of bore 60 of the mid-annular member 40 which was previously described. It is to be noted that the front portion 70 constitutes a front metallic mass directly in the axial path of any backfire wave and so can dissipate the energy of such a wave. The flat transverse forward face of the core element is numbered 71. It is to be noted that the axial space forward of wall 71 and including the mixing passage 31 constitute an axial passage. This axial passage can be referred to as an axial aspirating mixing passage.

The interior of the core element 42 has an axial hole 75 which extends longitudinally from the rear face of the core element 42 to the rearpart of the front portion 70 of the core element. At this location, just forward of the juncture of the mid-portion 72 and the front portion 70, four transverse radial holes 76 extend from the axial hole 76 through the surface of the forward portion 70. Three of these holes 76 appear on the drawing.

As above-mentioned, the core element 42 is press-fitted into the mid-annual member 40 with the result that the annular shoulder 77, which is formed at the juncture of the main rear portion 74 and the mid-portion 72 of the core element, bears against the radially innermost part of the forward transverse wall of the acetylene distribution chamber 65. When so assembled it can be seen that an annular passage 80 is formed between the forward bore 60 of the mid-annular member 40 and the surface of the front portion 70 of the core element 42. This annular passage 80 can be referred to as a surface quench passage.

The diameter of the forward bore 60 is such in relation to the diameter of the front portion 70 of the core element that the annular surface quench passage 80 has a transverse thickness or radial dimension of about 0.018 of an inch preferably between .016 to .024 of an inch which is considered critical to the provision of an effective surface quench passage for deactivating backfire gases. It is to be noted that the surfaces forming passage 80 are smooth as previously described and that this dimension has been enlarged on the drawing.

Since the length of the core element 42, forwardly of the shoulder 77, is less than the length of the forward bore 60 of the annular member, a short continuous transverse slot or passage 82 is formed radially outwardly of orifice 63. This slot 82 has a diminishing cross-sectional area radially inwardly and terminates in orifice 63. The axial width of slot 82 is preferably between 0.013 to 0.015 of an inch and the radial length is about 0.06 of an inch. This slot 82 with its orifice 63 can be referred to as a radial-to-axial injector slot since any gas flowing therethrough will flow radially and then change to an axial direction after passing over the sharp circular edge or orifice 63 of the lip 62. It is to be noted that any gas flowing inwardly in slot 82 will have its velocity increased to some extent due to the diminishing cross-sectional area.

It is also to be noted that the forward face 71 of the core element 42 provides a flat transverse wall which constitutes practically the entire rear wall of the aspirating mixing passage. Furthermore, it should be observed that the only structure between this central rear wall 71 and the acetylene passage 52 is the relatively thin lip 62 and the thin slot 82, and hence the acetylene passage 52 is closely adjacent to the rear wall of the aspirating mixing passage.

Rearwardly from the aspirating zone and between the acetylene chambers 65 and 28, it can be seen that the outer surface of the rear main portion 74 of the core element 42 is spaced from the rear bore 61 of the mid-annular member in order to provide an unrestricted annular passage 84 for the flow of acetylene between the two annular chambers 28 and 65. This passage 84, along with the downstream chamber 65, holes 67, and passage 52, and with upstream the flow path including annulus 28, and passages 26, 25 can be referred to as an unrestricted acetylene supply passage.

In Fig. 4 a slightly modified mixer assembly is shown. All structure is the same as in the other mixers on the drawing except that a very small (0.028 inch), axial oxygen jet 90 is provided in the front portion 70 of the core element 42 and this jet 90 connects with oxygen passage 75. The size of this jet is exaggerated on the drawing in order that it can be clearly shown. In practice, the size of this jet is such that the forward face 71, constituting the principal part of the rear wall of the aspirating mixing passage, remains substantially imperforate insofar as the majority of the backfire wave is concerned. This Fig. 4 modification alters the regular aspirating action slightly but in no substantial manner does it interfere with the aspiration or resistance to flashback which are subsequently described. In fact, this axial jet 90 which is in the direct line of backfire is made small enough so as to provide a quenching action on the backfire which does pass therethrough and thereby contributes to the mixer's stability.

The flows of oxygen and acetylene in normal aspirating operation of the mixer and torch will now be followed with reference to Fig. 2. Oxygen from axial oxygen passage 20 in gas distributor 16 enters the axial bore 75 of the core element 42 and then flows radially outward through the four holes 76 into the annular oxygen quench passage 80 which has the aforementioned essential radial dimension and smooth surfaces. The oxygen next flows longitudinally forward into the transverse slot 82 which has aforementioned relatively short radial length and longitudinal width. In the slot 82, the oxygen begins to flow radially inwardly and is accelerated due to the diminishing cross-sectional area of the transverse slot 82. When the oxygen reaches the orifice 63 formed by the sharp rear edge of lip 62, it will rather abruptly change directions and constrict itself into an axial flow, temporarily having a cross-sectional area smaller than the area of the orifice 63. At this point, adjacent to but forward of, the orifice 63, the oxygen flow will have an aspirating action on acetylene in the relatively large transverse annulus 52. Furthermore, it is believed that the constriction, formed by the radial-to-axial flow of the oxygen, has an internal turbulence which contributes subsequently to effective mixing.

The normal flow of the aspirated acetylene in the mixer M starts as the acetylene from bore 26 flows into rear chamber 28 and then through the annular passage 84. After passing through annular passage 84 into forward acetylene chamber 65, the acetylene then flows through the twelve longitudinal holes 67 in the forward part of the annular member 40. The acetylene is next discharged from the holes 67 into the large transverse acetylene passage or annulus 52. The acetylene in annulus 52 is then aspirated by oxygen which flows as above-described. It is to be noted again that the acetylene flow-path is large and unrestricted.

During and after the aspiration, the oxygen and acetylene thoroughly mix in mixing passage 31 and the torch tip passage 32 and then are burned at the orifice of the torch tip T in the conventional manner to provide the heat for welding or other similar operations.

In the above manner, relatively high pressure oxygen flows radially-to-axially and forms a constriction which has effective aspirating action on the acetylene, and the oxygen and acetylene are thoroughly mixed in order to provide a suitable flow of properly mixed oxygen and acetylene to an oxygen-acetylene flame device.

From the foregoing it can be seen that three basic parts which form the mixer M are assembled in a simple manner and when assembled provide the annular quench passage 80, the radial-to-axial, oxygen aspirating flow path 82, 63, 31 and the unrestricted acetylene passage or annulus 52 which opens into the aspirating mixing passage at the point where the oxygen has its most effective aspirating action.

Along with providing the above-described aspiration and mixing, the instant invention also greatly minimizes the possibility of flashback and the damages resulting therefrom. The construction which is believed to be important in providing the stability or resistance to flashback is (1) the flat rear wall of the aspirating mixing passage which is substantially the face 71 of the metallic mass 70, (2) the sinuous, restricted oxygen passage including a surface quenching passage 80 and (3) the lengthy unrestricted acetylene flow-path having a large normal-flow passage or inlet 52 which is closely adjacent to the rear wall 71 of the aspirating mixing passage. It is believed that these features provide a particular operation which involves deactivating backfire gases by impact with the rear wall 71 and its metallic mass 70, by directing the far greater part of the backfire up the acetylene passages after impact, by surface quenching of the small quantity of backfire which flows in the oxygen passage and by the consequential return sequence of normal-flow gases which results from the impact diversion of the backfire gases and the respective pressures of the oxygen and acetylene.

As above suggested, the precise manner in which the instant aspirating mixer operates after backfire is not completely understood. Although other explanations of phases of the operation may be made, it is believed that the instant invention operates to provide flashback resistance as set forth in the succeeding description. Regardless of the accuracy of this description, experiments have proven the stability of the instant invention when used with a range of tips.

Assuming that a very rapid inward propagation of flame has commenced and that a burning wave-front is rushing back through the aspirating mixing passage of the mixer M, it is believed that substantially all of the explosive wave front collides with the flat rear wall 71 of the aspirating mixing passage with the result that some of the energy of gases in the wave is dissipated by the collision and some of the heat energy is absorbed by the metallic mass of the forward portion 70 of the core element 42 which forms rear wall 71. After this collision or impingement, the wave-front of gases is, of course, radially diverted and it is believed that practically all of the backfire gases move into the acetylene passage 52 since the passage or inlet 52 is quite adjacent to the wall 71 and since the innermost cross sectional area of the oxygen slot 82 is relatively small and restricted. Furthermore, the unrestricted acetylene passages upstream, from and including, acetylene annulus 52 contain low pressure acetylene which constitutes a relatively low pressure area into which the backfire can more easily flow.

Referring now to the oxygen flow path, it seems that both the higher pressure of the oxygen and the relatively restricted and sinuous oxygen passages upstream from orifice 63 tend to resist any wave flow and so permit only a small amount of backfire gases to move into the oxygen-flow channels. It is believed that this small flow of backfire into the oxygen passage is then effectively deactivated in the thin annular surface quench passage 80 by contact with its surfaces so that this backfire is incapable of igniting any combustible mixture which may form in the aspirating mixing space due to eddying or some other effect. This backfire is soon flushed out by the oxygen as it recommences flow in the normal direction.

The travel of the larger quantity of backfire gases after impact with the rear wall and diversion into the unrestricted acetylene flow path apparently will be over a greater distance and hence for a greater length of time than the backfire gases in the oxygen channels. Since the backfire gases moving in the acetylene channels take a long period of time for their travel and contact exteriorly disposed walls, they apparently will be effectively deactivated during the rearward and forward travel. Another feature which may be of importance is that the gases returning from the acetylene passages may be diluted and cooled by being aspirated by, and mixed with, the fresh oxygen which is flowing in the normal direction.

The foregoing description is made under the assumption that all of combustible mixture is burned during backfire. This may not be the case and it is to be noted that, if any combustible mixture is pushed before the backfire wave, practically all of this combustible mixture will be pushed into the non-combustion-supporting acetylene passages and will be smothered. The remainder of any such combustible mixture is pushed before the small quantity of backfire gases which enter the restricted oxygen flow path and is soon burned by the combustion supporting oxygen. It is believed that the surface quenching passage 80 deactivates these burned gases along with the quantity of originally burned backfire which does enter the oxygen passages.

In agreement with the foregoing explanation, the return sequence of the gases to the aspirating and mixing point after backfire would be chronologically (1) the small quantity of deactivated backfire gases from the oxygen channels, (2) the normal-flow oxygen gas, (3) the deactivated burned-out and smothered backfire gases from the acetylene channels which would be aspirated by, mixed with, and hence diluted and cooled by the normal-flow oxygen and (4) the deactivated tail-end backfire gases from the acetylene channels along with normal-flow acetylene which is aspirated by, and mixed with, normal-flow oxygen. Thus, it can be explained how, at the time and at the location when and where a combustible mixture of acetylene and oxygen is formed, there usually are no backfire gases which are capable of igniting the newly-formed combustible mixture.

An important feature of the instant invention is the aspirating construction which, during backfire, presents an impact wall and reduces the quantity of backfire gases which enter the oxygen passage to a small amount and yet provides adequate aspiration during normal operation. It is to be noted that the only structure which forwardly spaces the acetylene passage from the wall is (1) the very thin lip forming the oxygen orifice and (2) the very narrow radially-extending oxygen passage formed by the lip and the continuous radial extension of the rear wall. Thus, after collision, the great majority of backfire gases will flow up the acetylene passages against the low pressure acetylene rather than flow up, in appreciable quantity, the very narrow or restricted oxygen passage against the higher pressure oxygen. It is also to be noted that there is no axial oxygen passage into which an appreciable slug of the backfire gases will directly surge during the rearwardly movement of the explosive wave, and that the aspirating construction provides for right-angled turns by both flows of backfire gases which is believed to provide an effect which promotes deactivation.

In this specification, the apparatus and mode of operation are described with reference to the use of oxygen and acetylene. However, it is to be understood that other similar combinations of a combustible gas and a combustion-supporting gas can be used in the apparatus. Furthermore it is obvious that the aspirating mixer of the instant invention can be incorporated in many other types of apparatus such as oxygen cutting devices which employ a preheat oxy-acetylene flame or other similar flames.

The described and illustrated mixer is adapted for use with torch tips whose orifice diameters range between about ⅓ and ¼ of an inch. However, the mixer is adaptable by changes to provide a mixer for other torch size ranges. The only dimension which would not be proportionally altered would be the radial dimension of the annular surface quench passage 80.

From the foregoing, it will be apparent that an aspirating mixer having the following desirable features has been provided: (a) adequate aspirating and mixing, (b) high resistance to flashback and (c) simplicity and ease of fabrication. The radial-to-axial aspirating structure is fundamentally different from the usual axial oxygen jet means and this aspirating structure provides an important part of the means for obtaining a high resistance to flashback. By this integration, a mixer which is simple and easy to assemble has been provided and the use of Venturi throats and conical passages has been eliminated.

Although the preferred forms of the invention have been specifically illustrated and described, it will be apparent that one skilled in the art might make various changes without departing from the spirit of the invention as defined in the following claims.

I claim:

1. An aspirating oxygen-acetylene mixer comprised of a tubular mixer body having an axial aspirating-mixing passage, a mid-annular member coaxial with said passage and having a smooth bore, a cylindrical core element positioned coaxially in said bore and disposed somewhat rearwardly of the mixing passage; said core element having a cylindrical metallic mass front portion and a transverse front wall; a thin substantially annular transverse lip extending inwardly and terminating with a circular inner edge which is coaxial with said mixing passage; said circular edge having a diameter which is relatively substantially less than the diameter of said mixing passage and relatively substantially less than the diameter of said cylindrical mass; said lip being spaced but slightly forward of said front wall of the core element thereby forming with said wall a continuous transverse slot for oxygen; said transverse slot opening rearwardly into an annular surface quench passage having a transverse dimension of about 0.016 to 0.024 of an inch and being formed by the surface of the forward portion of said bore and the surface of the front portion of said core element; said core element having means for passing oxygen under pressure to said quench passage; and means forming large-dimensioned passages arranged coaxially around said core element for supplying acetylene to the transverse acetylene annulus defined by the rearwardly projected periphery of said mixing passage and the forward transverse plane of said lip.

2. A gas mixer according to claim 1 and further including a very small, axial, oxygen jet extending through the metallic mass front portion of said core element.

3. A stable aspirating mixer for a relatively high pressure combustion-supporting gas and a low pressure combustible gas which comprises a core element having a front cylindrical mass; said mass having a flat transverse forward face and a smooth outer surface; a mid-annular member having a smooth bore and a forward, inwardly-extending transverse lip which terminates in a circular axial opening which has a diameter substantially less than the diameter of said cylindrical mass, said core element being positioned coaxially in the bore of said mid-annular member with the rear transverse face of said lip being spaced a small distance from said flat transverse forward face of said mass thereby providing a thin continuous transverse slot for the combustion supporting gas; said front cylindrical mass of the positioned core element having a diameter which is slightly less than the diameter of said smooth bore of said mid-annular member thereby providing an annular surface quench passage opening into said transverse passage; said quench passage having transverse dimension of about 0.016 to 0.024 of an inch; a tubular mixer body having an axial mixing channel of constant diameter and rearwardly thereof an axial cavity; said mid-annular member being positioned coaxially in said cavity with the forward face of said mid-annular member being spaced from the bottom of the cavity in said body thereby providing a large acetylene annulus; said core element having means for passing oxygen to said annular quench passage; said mid-annular member having large-dimensioned means for passing acetylene to said acetylene annulus and said circular axial opening of said lip having a diameter which is appreciably smaller than the diameter of the mixing channel; whereby oxygen flowing radially in said transverse passage and then forwardly through said circular axial opening will aspirate acetylene from the acetylene annulus during normal operation and whereby backfire will be deactivated.

References Cited in the file of this patent

UNITED STATES PATENTS

| | | |
|---|---|---|
| 1,419,054 | Ionides | June 6, 1922 |
| 2,130,344 | Jacobsson | Sept. 20, 1938 |
| 2,242,471 | Jones et al. | May 20, 1941 |
| 2,304,468 | Mahler | Dec. 8, 1942 |
| 2,348,839 | Oldham | May 16, 1944 |
| 2,618,322 | Conta et al. | Nov. 18, 1952 |
| 2,618,539 | Conta et al. | Nov. 18, 1952 |
| 2,759,531 | Anthes | Aug. 21, 1956 |

FOREIGN PATENTS

| | | |
|---|---|---|
| 289,131 | Germany | Dec. 7, 1915 |
| 23,962 | Great Britain | of 1908 |